United States Patent [19]

Lin

[11] Patent Number: 5,185,893
[45] Date of Patent: Feb. 16, 1993

[54] WATER TAP WITH SINGLE KNOB HOT/COLD WATER FLOW CONTROL AND SHOWER SWITCHING CONTROL

[76] Inventor: Kuang-Hui Lin, No. 270-7, Pien Hsing Lane, Hsueh Tien Rd., Wu Jih Hsiang, Taichung Hsien, Taiwan

[21] Appl. No.: 775,903

[22] Filed: Oct. 15, 1991

[51] Int. Cl.⁵ ................. E03C 1/042; F16K 11/16; A47K 3/22
[52] U.S. Cl. .......................... 4/677; 4/568; 4/615; 137/597; 137/625.41
[58] Field of Search .............. 4/675, 676, 677, 678, 4/615, 567, 568, 570; 137/597, 625.41, 636.1, 355.18

[56] References Cited

U.S. PATENT DOCUMENTS

| | | | |
|---|---|---|---|
| 1,729,306 | 9/1929 | Woodford | 137/355.18 |
| 1,809,567 | 6/1931 | Pasman | 137/597 |
| 1,822,346 | 9/1931 | Guiles | 137/636.1 |
| 1,840,961 | 1/1932 | Kuenzler | 137/636.1 |
| 2,519,158 | 8/1950 | Symmons | 137/597 |
| 2,767,019 | 10/1956 | Manville | 137/597 |
| 2,934,091 | 4/1960 | Chapou | 137/636.1 |
| 3,245,430 | 4/1966 | Enterante | 137/597 |
| 3,414,018 | 12/1968 | Eversman | 137/597 |
| 4,662,399 | 5/1987 | Buchner et al. | 137/625.4 X |
| 4,957,137 | 9/1990 | Wang | 137/636.1 X |

FOREIGN PATENT DOCUMENTS

| | | | |
|---|---|---|---|
| 1207298 | 12/1965 | Fed. Rep. of Germany | 4/676 |
| 3306690 | 9/1983 | Fed. Rep. of Germany | 4/676 |
| 0439186 | 6/1949 | Italy | 4/678 |
| 0280137 | 11/1989 | Japan | 4/677 |
| 3-199534 | 8/1991 | Japan | 4/570 |
| 3-286049 | 12/1991 | Japan | 4/675 |

*Primary Examiner*—William A. Cuchlinski, Jr.
*Assistant Examiner*—John L. Beres
*Attorney, Agent, or Firm*—Bacon & Thomas

[57] ABSTRACT

A water tap having a hot water intake hole and a cold water intake hole respectively connected to a water passage and controlled by a knob through two plungers, said water passage having a first water outlet at the top connected to a shower head and a second water outlet at the bottom attached with a water outlet pipe, a water flow direction control to alternatively guide flow of water to flow from said hot or cold water intake hole or from said hot and cold water intake holes through said first or second water outlet, and a shower switching control unit to stop flow of water from said shower head when said shower head is hung on a shower head holder or to let flow of water dishcarge through said shower head when said shower head is removed from said shower head holder.

5 Claims, 6 Drawing Sheets 5,185,893

WATER TAP WITH SINGLE KNOB HOT/COLD WATER FLOW CONTROL AND SHOWER SWITCHING CONTROL

BACKGROUND OF THE INVENTION

The present invention relates to water taps and relates more particularly to a water tape with single knob hot/cold water flow control and shower switching control, in which flow rate of hot and cold water is regulated by a common knob; a shower switching control unit is provided to let flow of water automatically discharge through a shower head for shower when the shower head is removed from a shower head holder.

Several hot/cold water flow rate controlling devices have been known. However, according to conventional method, hot flow of water and cold flow of water are separately controlled by two separate control valves which are controlled by two control knobs respectively. This hot/cold water flow rate control method is complicated to regulate water temperature. Because hot and cold flows of water are separately controlled by two control knobs, constant water temperature is difficult to obtain. Further, when a shower head is used it is generally directly attached to a branch outlet extending from the water outlet hole of a hot/cold water flow rate control device. While taking a shower bath, one may spend one hand to hold a shower head and spend the other to regulate the flow rate of hot and cold water.

SUMMARY OF THE INVENTION

It is one object of the present invention to provide a hot/cold water tap which is so arranged that flow rate of hot and cold water can be simultaneously controlled by a common control knob.

It is another object of the present invention to provide a hot/cold water tap which has a shower switching control unit to automatically let flow of water discharge through the shower head which is attached thereto when the shower head is removed from place.

According to the present invention, the casing of the water tap comprises a hot water intake hole at one side, a cold water intake hole at an opposite side, a vertical water passage at the middle which has a first water outlet at the top connected to a shower head and a second water outlet at the bottom connected to a water outlet pipe, a first plunger driven by a rotary cap through a driving rod to alternatively block up said first or second water outlet, a second plunger controlled to close/open the passage way between said cold water intake hole and said vertical water passage, a third plunger controlled to close/open the passage way between said hot water intake hole and said vertical water passage, and a control knob mounted on said second and third plungers and rotated to move said second and third plungers forwards or backwards for controlling the passages between said hot and cold water intake holes and said vertical water passage. The control knob has two circular tracks in different depth with one inside the other for guiding and moving the second and third plungers respectively. Therefore, flow rate of hot and cold water is regulated by rotating the control knob within 360° angle. Further, a shower switching control unit is attached to the first water outlet to automatically control flow of water to a shower head attached thereto. The shower switching control unit comprises an adjustable shower head holder attached to an actuating rod which is forced by a torsional spring to move a valve from a valve seat for the passing therethrough of flow of water coming from the first water outlet toward the shower head. When the shower head is hung on the shower head holder, the actuating rod is rotated to move the valve into the valve seat, and therefore, flow of water is automatically stopped from the shower head.

DETAILED DESCRIPTION OF THE PREFERRED EMBODIMENT

Figure 1:
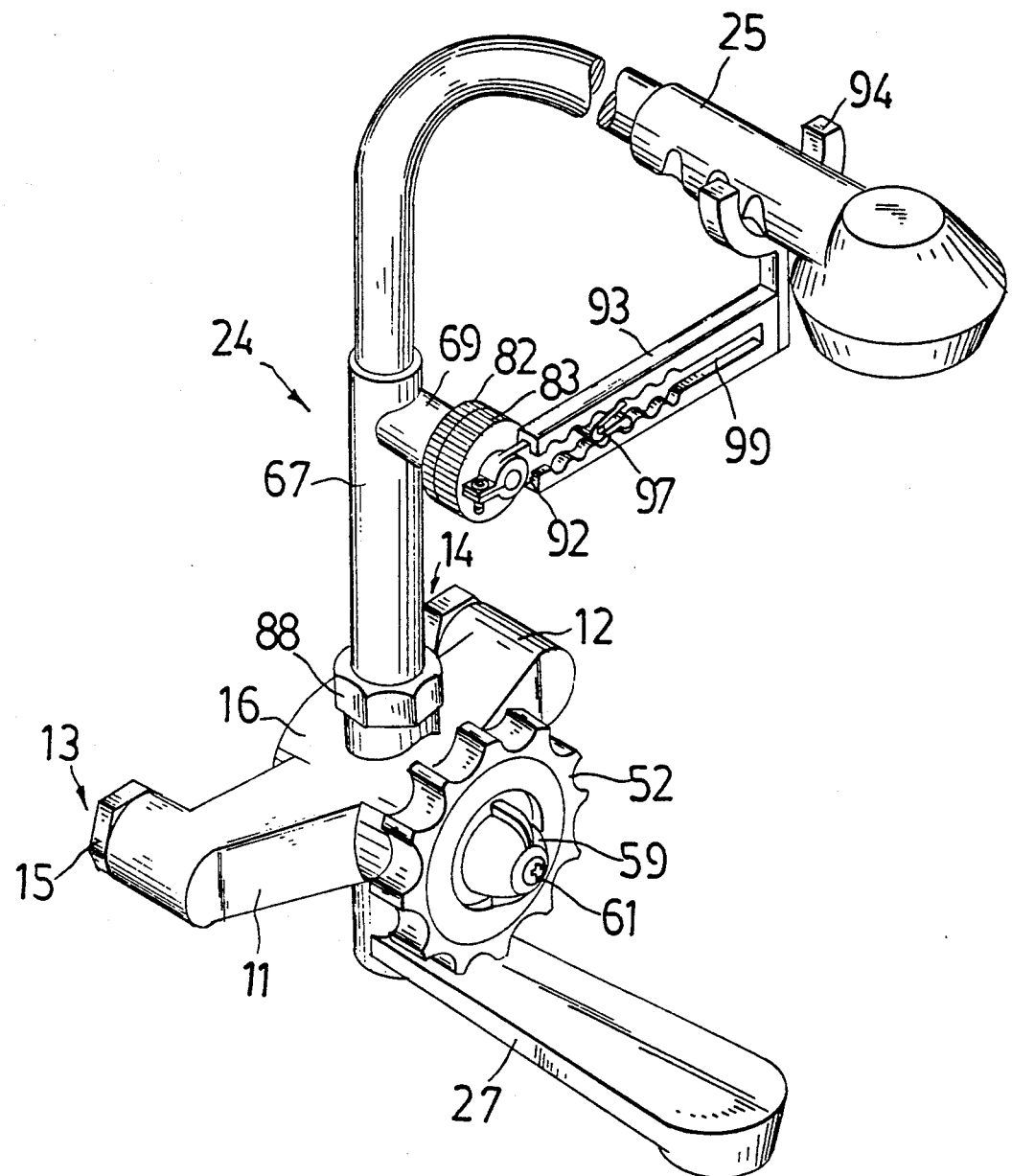
FIG. 1 is an elevational view of the preferred embodiment of the water tape of the present invention.
Figure 2:
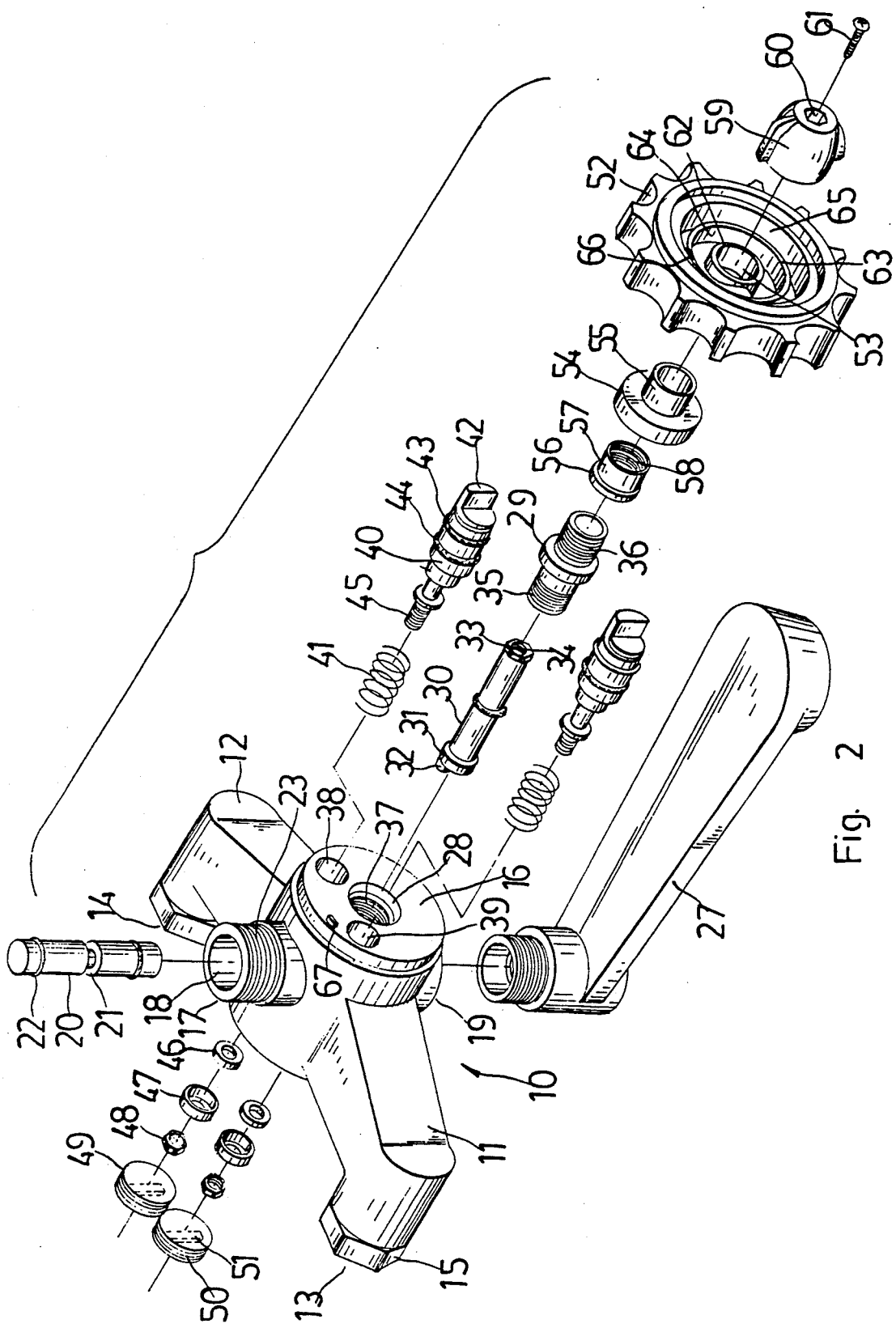
FIG. 2 is an exploded perspective view thereof.

Referring to FIGS. 1 and 2, therein illustrated is a water tap embodying the present invention. The casing 10 of the water tap is comprised of a water flow control unit 16 at the middle, and two hollow side extensions 11, 12 at two opposite sides. Each side extension 11 or 12 has a hot or cold water intake hole 13 or 14 for taking in hot or cold water, and a hexagon nut 15 for securing to a hot or water supply pipe. The water flow control unit 16 has a vertical hole 17 vertically piercing therethrough for fastening a top plunger 20, which vertical hole 17 forms into a top water outlet 18 at the top and a bottom water outlet 19 at the bottom. The top plunger 20 has an annular groove 21 around the peripheral surface thereof at the middle, and is fastened with two seal rings 22 at two opposite ends. An outer thread portion 23 is made on the water flow control unit 16 above and around the top water outlet 18 for connecting a shower head 25 by a shower switching control unit 24. An inner thread portion 26 is made on the water flow control unit 16 below and around the bottom water outlet 19 for connecting a water outlet pipe 27. The water flow control unit 16 further comprises a center hole 28, two eccentric holes 38, 39, and a locating flange 69 on the front face thereof, wherein the center hole 28 extends to the hole 17 and comprises an inner thread portion 37 for fastening a connector 29 to hold a driving rod 30; the eccentric holes 38, 39 are respectively piercing through the water flow control unit 16 in longitudinal direction and connected to the cold water intake hole 14 or the hot water intake hole 13. The connector 29 is made from a tube having two outer thread portions 35, 36 at two opposite ends, wherein the outer thread portion 35 is screwed into the inner thread portion 37 in the center hole 28. The driving rod 30 is made from a tube having an inner thread portion 34 and a polygonal end edge 33 at one end and a flange 31 at an opposite end, which flange 31 has a tenon 32 projecting outwards in longitudinal direction. The driving rod 30 is inserted through the connector 29 into the center hole 28 with its tenon 32 engaged into the annular groove 21 on the top plunger 20. Therefore, rotating the polygonal end edge 33 causes the top plunger 20 to move upwards or downwards so as to seal up the top water outlet 18 or the bottom water outlet 19. The two eccentric holes 38, 39 are disposed in parallel with the center hole 28, each of which having a side plunger 40 fastened therein and sleeved with a compression spring 41. Each side plunger 40 has two spaced seal rings 43, 44 fastened thereon at the middle, a tongue 42 at one end, and a screw rod 45 at an opposite end, which screw rod 45 has a gasket 46 and a locating ring 47 secured thereto by a lock nut 48. When two side plungers 40 are respectively fastened in the two eccentric holes 38, 39, two sealing caps 49 are respectively fastened in the two eccentric holes 38, 39 to seal the opposite ends thereof. The sealing caps 49 each has an outer thread portion 50 on the peripheral surface thereof for fastening in the eccentric hole 38 or 39 through screw joint, and a groove 51 on the back face thereof for driving by a screw driver.

Referring to FIG. 2 against, a control knob 52 is fastened in the water flow control unit 16 at the front for flow control. The control knob 52 has a center hole 53 at the center, a stub tube 62 longitudinally aligned with said center hole 53 at one side, a ring-shaped wall 63 surrounding around said stub tube 62, a first track 64 defined between said stub tube 62 and said ring-shaped wall 63, a second track 65 around said ring-shaped wall 63 at the outside, and an inward projection 66 on the inner wall surface thereof at a suitable location. A heat insulator 54 which has a stub tube 55 at the center is fastened in the center hole 53 on the control knob 52 and mounted on an insulator holder 56 which has an inner thread portion 58 on the inner wall of the ring-shaped body 57 thereof and is screwed onto the outer thread portion 36 of the connector 29. The polygonal end edge 33 of the driving rod 30 is inserted through the connector 29, the insulator holder 56, the heat insulator 54 and the center hole 53 and then locked up with a rotary cap 59 by a screw 61 which is inserted through a polygonal hole 60 on the rotary cap into the inner thread portion 34 on the driving rod 30. While fastening the control knob 52 onto the connector 29 and the driving rod 30, the tongues 42 of the two side plungers 40 are respectively inserted into the first and second tracks 64, 65. The second track 65 is for controlling the flow rate of cold water and made in a double-bevel structure, i.e. the second track 65 starts from the deepest point with its depth gradually reducing when it goes toward the midpoint and, from the midpoint the depth of the second track 65 is gradually increasing when it goes toward the deepest point. The first track 64 is for controlling the flow rate of hot water. The depth of the first track 64 is uniform at the beginning, and then, it is gradually reducing. Rotating the control knob 52 will causes the raised portion 66 to be stopped at the locating flange 67, i.e., the locating flange 67 confines the control knob 52 to be rotated within a fixed angle.

Figure 6:
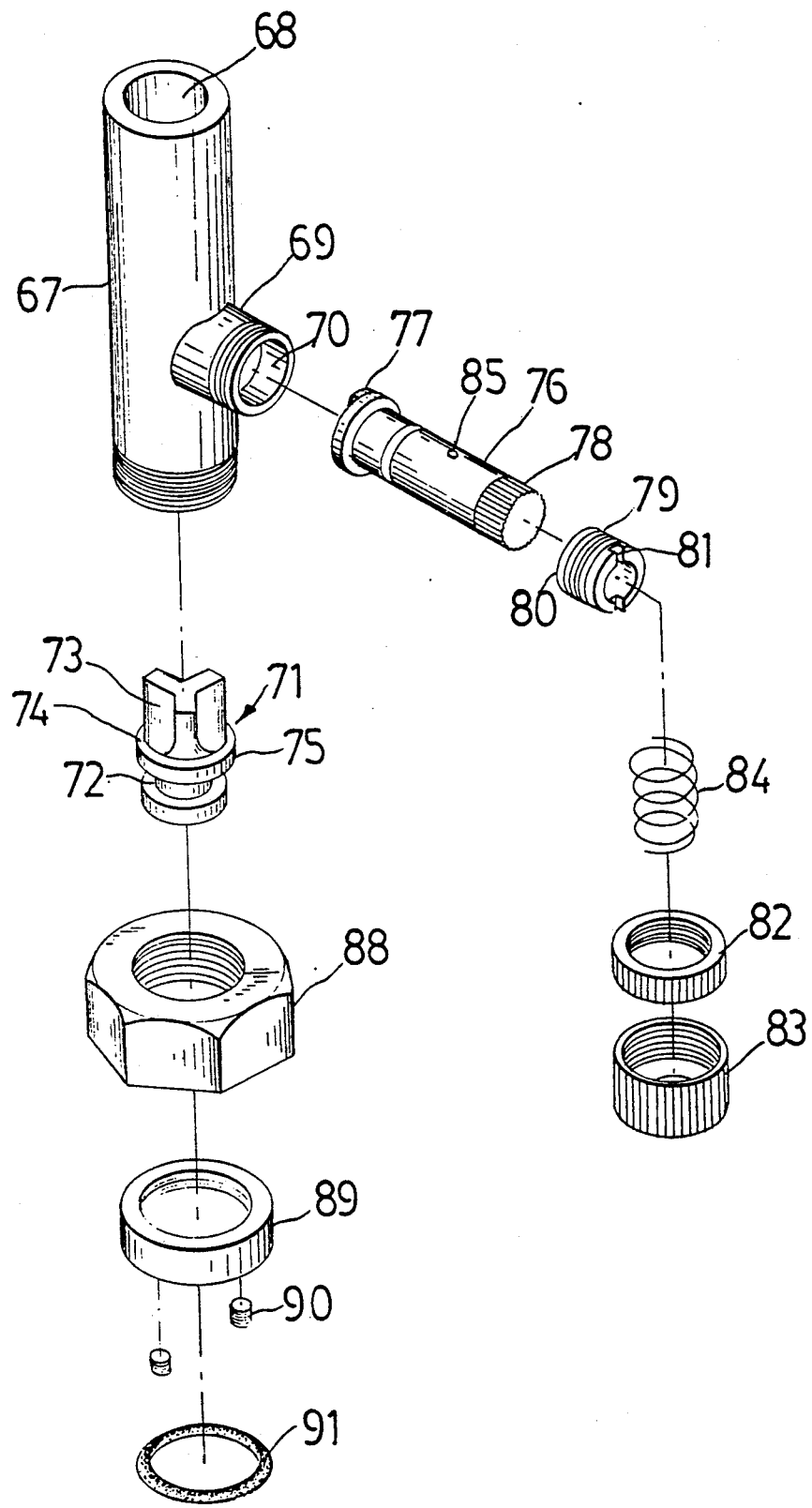
FIG. 6 is an exploded perspective view of the shower switching control unit thereof.
Figure 7:
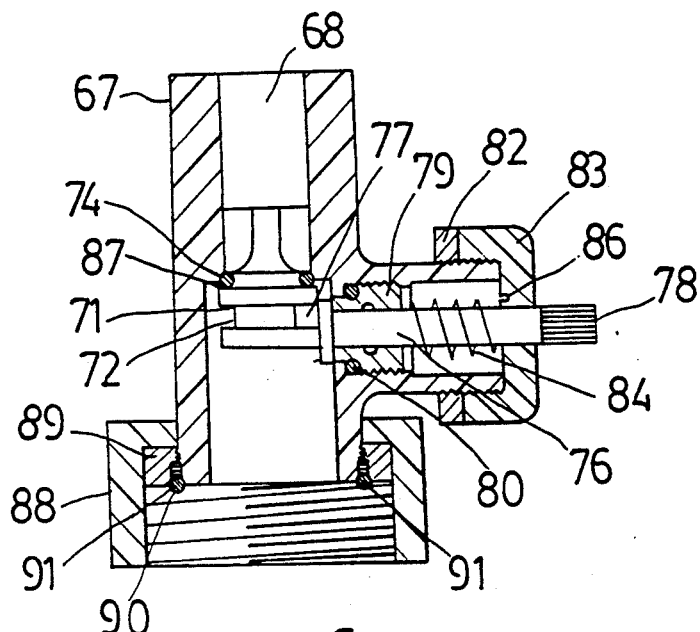
FIG. 7 is a sectional view of the shower switching control unit taken in longitudinal direction.

Referring to FIGS. 6 and 7, the shower switching control unit 24 comprises a casing 67 having a vertical hole 68 through the central axis thereof and a side tube 69 at right angle. The side tube 69 of the casing 67 defines therein a side hole 70 in connection with the vertical hole 68. There is a control valve 71 fastened in the vertical hole 68 and an actuating rod 76 fastened in the side hole 70. The control valve 71 has an annular groove 72 on the peripheral surface thereof, a flow guide post 73 at the top which has substantially Y-shaped cross section, and an O-ring 74 on the bottom end 75 of the guide post 73. The actuating rod 76 has a tongue 77 at one end engaged into the annular groove 72 on the control valve 71, a hole 85 at the middle, and a toothed portion 78 at an opposite end. A tubular fastening element 79 is fastened in the side hole 70 through screw joint to secure the actuating rod 76 in place. The fastening element 79 has an O-ring 80 mounted thereon to seal off the gap between the side tube 69, and two opposite notches 81 at one end. Once the fastening element 79 is screwed into the side hole 70 to secure the actuating rod 76 therein, a locating nut 82 and an adjusting cap 83 are respectively mounted on the side tube 69 to hold a torsional spring 84. As illustrated in FIG. 7, the torsional spring 84 is sleeved on the actuating rod 76 with one end fastened in the hole 85 on the actuating rod 76 and an opposite end fastened in a side hole 86 on the adjusting cap 83. The adjusting cap 83 further comprises a center hole (not shown) at the center through which the toothed portion 78 of the actuating rod 76 projects outwards. By means of the operation of the torsional spring 84, the tongue 77 of the actuating rod 76 is forced to push the control valve 71 away from a valve seat 87 so that flow of water is permitted to pass through the vertical hole 68. By means of rotating the adjusting cap 83, the pressure applied at the actuating rod 76 by the torsional spring 84 is adjusted. Once the adjusting cap 83 is adjusted, the locating nut 82 is rotated toward the adjusting cap 83 so as to support it in position. Further, the casing 67 has one end fastened in the first water outlet 18 on the water flow control unit 16 by a lock nut 88, a ring 89 and an O-ring 91. As illustrated in FIG. 7, the lock nut 88 is screwed up with the outer thread portion 23 to secure the casing 67 to the water flow control unit 16, the ring 89 is fastened on the bottom end of the casing 67 by screw joint and retained inside the lock nut 88. After the ring 89 has been mounted on the casing 67, two small holes are made on the seam between the ring 89 and the casing 67 at two opposite locations for fastening two screws 90. By means of this arrangement, the ring 89 will not be rotated relative to the casing 67.

Figure 8:
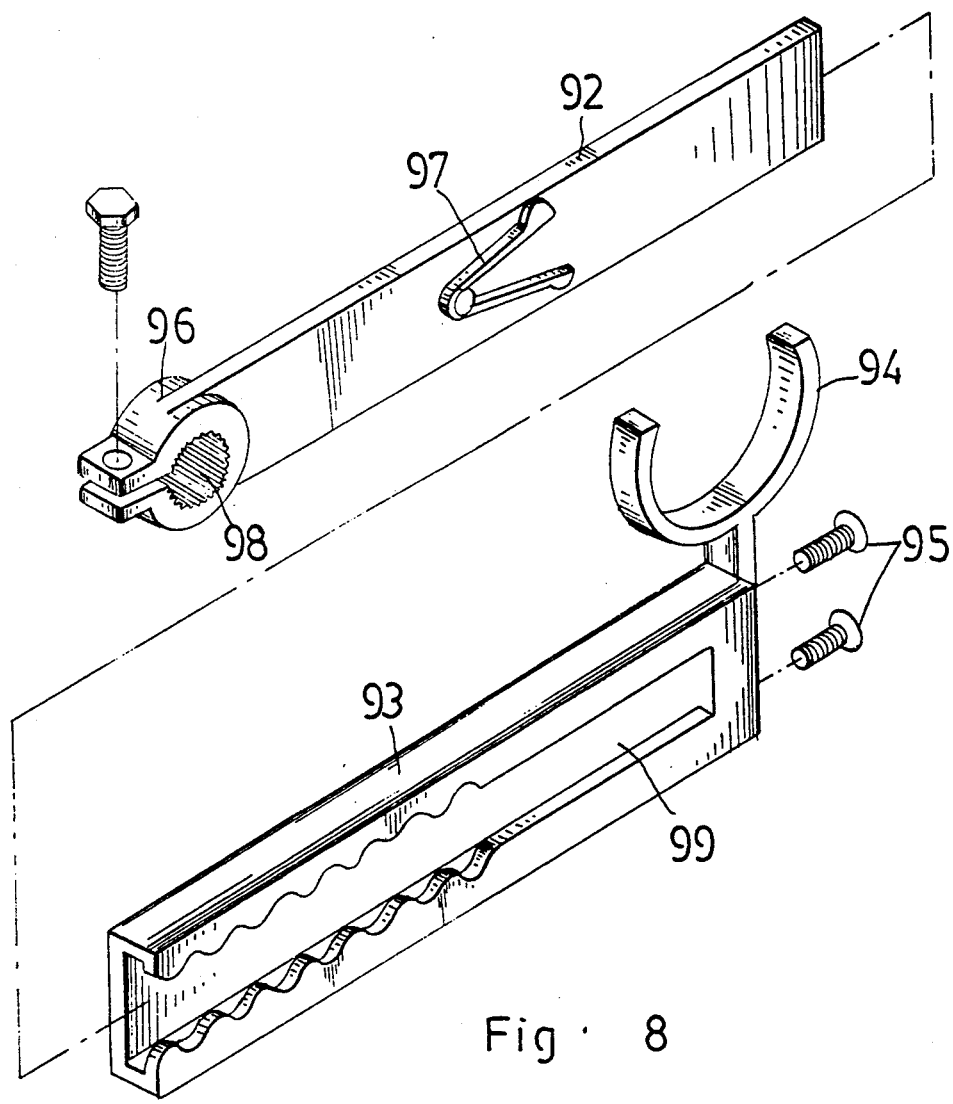
FIG. 8 is an exploded perspective view of the shower head holder.

Referring to FIG. 8 and seeing FIG. 1 again, a shower head holder is connected to the toothed portion 78 of the actuating rod 76. The shower head holder is comprised of a support 92, an adjusting rod 93, and a rack 94 for shower head. The rack 94 is attached to the adjusting rod 93 at one end by screws 95. The support 92 has a clamp 96 at one end which has a toothed portion 98 on the inner wall surface thereof, and two hooked spring strips 97 at one side. By means of the toothed portion 98, the clamp 96 of the support 92 can be secured to the toothed portion 78 on the actuating rod 76. The adjusting rod 93 has a sliding groove 99 at one side in longitudinal direction into which the support 92 is inserted. When the adjusting rod 93 is mounted on the support 92, it can be moved back and forth in longitudinal direction so as to adjust the total length of the shower head holder. By means of the hooked spring strips 97, the adjusting rod 93 can be secured to the support 92 in position.

Figure 3:
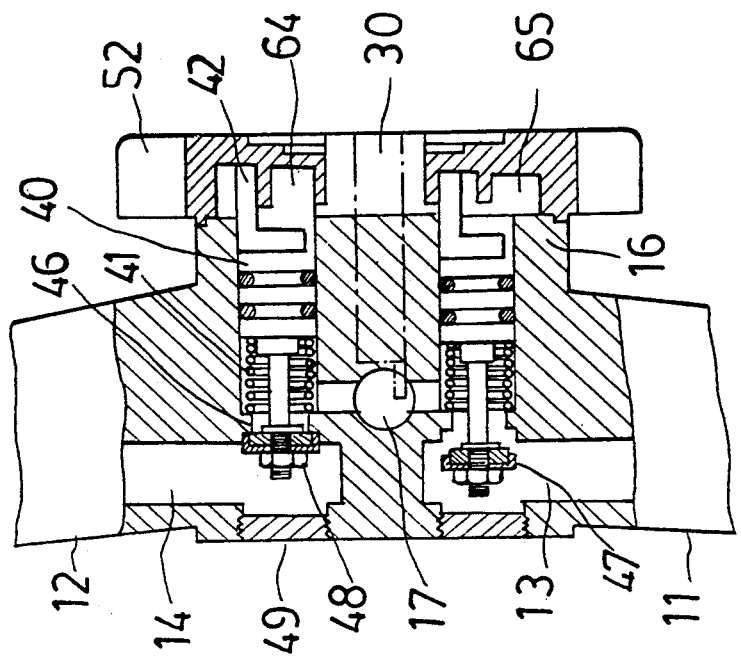
FIG. 3 is a sectional view thereof showing that the water passage for cold water is fully opened while the water passage for hot water is completely closed.
Figure 4:
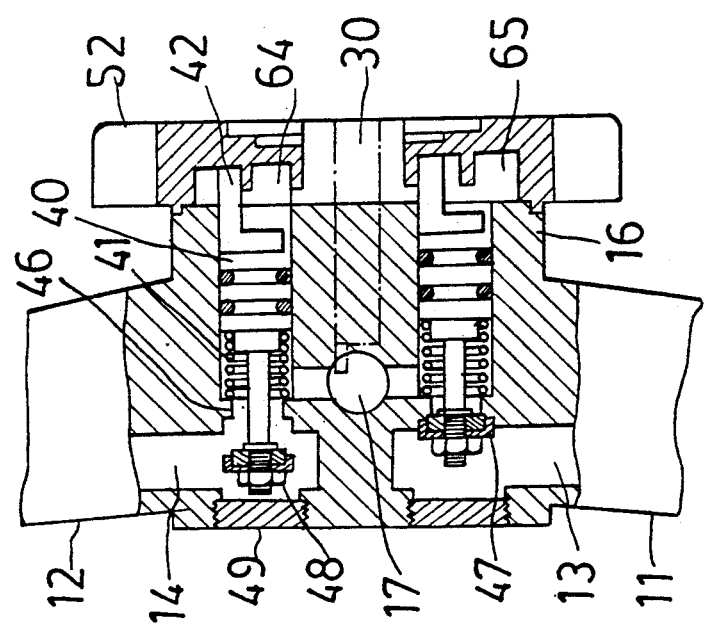
FIG. 4 is another sectional view thereof showing that the water passage for hot water is fully opened while the water passage for cold water is completely closed.
Figure 5:
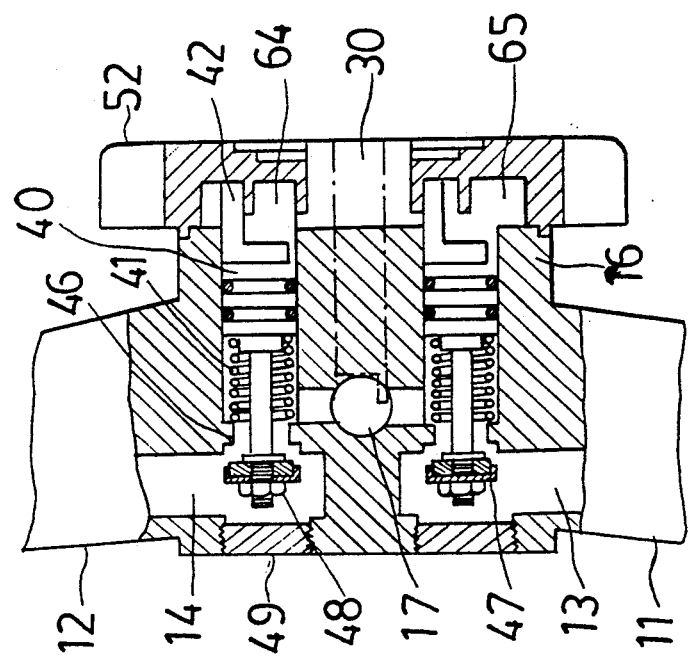
FIG. 5 is still another sectional view thereof showing that water passage for hot water and the water passage for cold water are simultaneously opened for mixing hot and cold water.

The operation of the present invention is simple and outlined hereinafter. Rotating the rotary cap 59 causes the driving rod 30 to rotate, and therefore, the top plunger 20 can be moved upwards to seal up the first water outlet 18. At the same time, the tongues 42 of the two side plungers 40 are forced by the compression springs 41 to respectively dispose in the tracks 64, 65 at lower limit positions, causing the locating rings 47 and the gaskets 46 to respectively seal up the passage ways between the eccentric holes 38, 39 and the water intake holes 13, 14. Therefore, flow of water is stopped from passing through the water flow control unit 16. Rotating the control knob 52 firstly causes the tongue 42 on the right-sided side plunger 40 which is fastened in the right-sided eccentric hole 38 to be forced by the second track 65 to rotate, and therefore, the locating ring 47 and the gasket 46 on the opposite end of the right-sided side plunger 40 are gradually moving away from the passage way between the right-sided eccentric hole 38 and the cold water intake hole 14, permitting cold water to flow into the water flow control unit 16. At this stage, the tongue 42 on the left-sided side plunger 40 is still free from the constraint of the first track 64. When the control knob 52 is rotated to one fourth of its moving range, namely, 45° angle, cold water flows at a normal rate. Continuously rotating the control knob 52 forwards will increase the flow rate of cold water. The flow rate of cold water reaches the maximum when the control knob 52 is rotated to 180° angle (see FIG. 3). If the control knob 52 is rotated further, the tongue 42 on the left-sided side plunger 40 will be forced by the first track 64 to let hot water pass through the passage way between the hot water intake hole 13 and the left-sided eccentric hole 39. When the flow rate of hot water is increasing, the flow rate of cold water is reducing. When the control knob 52 is rotated to 270° angle, the flow rate between cold and hot water is equal (see FIG. 5). Once the flow rate of cold water is stopped, the flow rate of hot water reaches the maximum (see FIG. 4). When the flow rate of hot water reaches the maximum, the raised portion 66 on the control knob 52 is stopped at the locating flange 67 on the water flow control unit 16, and therefore, the control knob 52 is stopped from rotating forwards. If the control knob 52 is rotated backwards, the flow rate of hot water and cold water will be gradually turned off in proper order.

When the rotary cap 59 is rotated in reverse direction, the top plunger 20 will be moved by the driving rod 30 to seal off the second water outlet 19. By means of the control of the control knob 52, hot and cold water can be regulated to flow toward the shower head 25 through the shower switching control unit 24. However, when the shower head 25 is hung on the rack 94, the actuating rod 76 will by forced to rotate by the gravity of the shower head 25, causing the control valve 71 to stop at the valve seat 87, and therefore, flow of water is stopped from passing through the vertical hole 68 toward the shower head 25. Once the shower head 25 is removed from the rack 94, the actuating rod 76 will be automatically forced by the torsional spring 84 to return to its original position, causing the control valve 71 to move away from the valve seat 87, and therefore, flow of water is permitted to flow to the shower head 25.

We claim:
1. A water tap, comprising:
a casing having a hot water intake hole at one side, a cold water intake hole at an opposite side, a first water passage at the middle in vertical direction, said first water passage having two opposite ends terminating into a first water outlet hole at the top and a second water outlet hole at the bottom, said second water outlet hole being attached with a water outlet pipe, an opening on the front face thereof at the center in transverse direction connected to said first water passage, a locating flange projecting outwards from the front face thereof, a second water passage and a third water passage spaced from each other and respectively disposed in transverse direction, said second water passage being to guide cold water from said cold water intake hole into said first water passage for discharging through said first or second water outlet hole, said third water passage being to guide hot water from said hot water intake hole into said first water passage for discharging through said first or second water outlet hole;

a water flow rate control fastened in said casing to regulate flow of water from said cold and hot water intake holes, said water flow rate control comprising a second plunger fastened in said second water passage and rotated to close or open the passage between said cold water intake hole and said first water passage, a third plunger fastened in said third water passage and rotated to close or open the passage between said hot water intake hole and said first water passage, and a control knob mounted on said casing and rotated to alternatively move said second and third plungers back and forth, causing said second and third plungers to close or open the passage between said hot or cold water intake hole and said first water passage, said control knob having a raised portion movably stopped against said locating flange on said casing for revolving range control, a first guide track for controlling the movement of said second plunger and a second guide track for controlling the movement of said third plunger, said second and third plungers each being sleeved with a compression spring and having a tongue at one end releasably inserted in said first or second track, two spaced o-rings at the middle, and a screw rod at an opposite end, said screw rod being attached with a gasket, a locating ring and a lock nut;

a water flow direction control fastened in said casing to alternatively close or open said first and second water outlet holes, said water flow direction control comprising a first plunger inserted in said first water passage, said first plunger having an annular groove at the middle and two O-rings at two opposite ends, a driving rod inserted in said opening on said casing and rotated to alternatively move said first plunger up and down causing said first plunger to block up said first or second water outlet, and a rotary cap mounted on said control knob to drive said driving rod to rotate;

a shower switching control unit fastened in said first water outlet hole to control flow of water to a shower head, said shower switching control unit comprising a tubular casing having one end fastened in said first water outlet hole and an opposite end attached with a shower head, and a shower head holder attached to said tubular casing for holding said shower head, said tubular casing having a side tube at right angle, a valve seat fastened therein, said valve seat having a valve port for the passing therethrough of flow of water from said first water outlet hole, a valve moved to close or open said valve port, an actuating rod fastened in said side tube and forced by a torsional spring to hold said valve in said valve seat; and wherein rotating said rotary cap causes said first plunger to close said first or second water outlet hole permitting intake flow of water to flow through said second or first water outlet hole; rotating said control knob causes said second and third plungers to be moved forwards or backwards in proper sequence so as to let intake flow of water from said cold and hot water intake holes pass said second and third water passages for discharging through said first or second water outlet hole; removing said shower head from said shower head holder causes said valve to move away from said valve seat permitting flow of water from said first water outlet hole to discharge through said shower head; hanging said shower head on said shower head holder causes said valve to block up said valve port so as to stop flow of water from flowing toward said shower head.

2. The water tap of claim 1, wherein said shower head holder is comprised of a support having one end secured to said actuating rod, an adjusting rod fastened to slide on said support, and a rack attached to said adjusting rod for holding said shower head, said adjusting rod being moved on said support to adjust the arm of moment of said shower head holder acted upon said actuating rod.

3. The water tap of claim 1, wherein said shower switching control unit further comprises a locating nut and an adjusting cap mounted on said side tube to adjust the torsion of said torsional spring.

4. The water tap of claim 1, wherein said valve has an annular groove around the peripheral surface thereof, said actuating rod has a tongue at one end at an eccentric location engaged into said annular groove on said valve and rotated by said shower head holder to move said valve away from said valve port.

5. The water tap of claim 1, wherein said support of said shower head holder is detachably secured to said actuating rod.

* * * * *